(12) United States Patent  (10) Patent No.: US 7,729,033 B2
Souriau  (45) Date of Patent: Jun. 1, 2010

(54) PRODUCTION OF CAVITIES FILLED WITH A FLUID MATERIAL IN AN OPTICAL MICROTECHNOLOGICAL COMPOUND

(75) Inventor: Jean-Charles Souriau, Saint-Egreve (FR)

(73) Assignee: Commissariat a l'Energie Atomique, Paris (FR)

( * ) Notice: Subject to any disclaimer, the term of this patent is extended or adjusted under 35 U.S.C. 154(b) by 24 days.

(21) Appl. No.: 11/972,163

(22) Filed: Jan. 10, 2008

(65) Prior Publication Data

US 2008/0170298 A1  Jul. 17, 2008

(30) Foreign Application Priority Data

Jan. 16, 2007  (FR) .................................. 07 52706

(51) Int. Cl.
  *G02F 1/15*  (2006.01)
(52) U.S. Cl. ...................... 359/265; 359/272; 359/247; 359/296
(58) Field of Classification Search ................. 359/247, 359/253, 265, 272, 296
  See application file for complete search history.

(56) References Cited

U.S. PATENT DOCUMENTS 3,863,249 A    1/1975  Olah 6,947,202 B2 *  9/2005  Liang et al. .................. 359/296
7,136,216 B1    11/2006  Daniel et al.

FOREIGN PATENT DOCUMENTS

| | | |
|---|---|---|
| EP | 1 672 394 A1 | 6/2006 |
| FR | 2 879 757 A1 | 6/2006 |
| FR | 2 897 164 A1 | 8/2007 |
| WO | WO 02/088671 A1 | 11/2002 |
| WO | WO 03/021346 A1 | 3/2003 |
| WO | WO 2006/067309 A1 | 6/2006 |
| WO | WO 2006/067650 A1 | 6/2006 |
| WO | WO 2006/116616 A2 | 11/2006 |
| WO | WO 2007/090828 A1 | 8/2007 |

OTHER PUBLICATIONS

Matthieu Liger, et al., "Robust Parylene-To-Silicon Mechanical Anchoring", MEMS-03, IEEE, Micro Electro Mechanical Systems, the Sixteenth Annual International Conference, Jan. 19-23, 2003, pp. 602-605.

* cited by examiner

*Primary Examiner*—Joseph Martinez
(74) *Attorney, Agent, or Firm*—Oblon, Spivak, McClelland, Maier & Neustadt, L.L.P.

(57) ABSTRACT

A device including: a first layer of material; a second layer of material disposed as a sealing layer; walls disposed to interconnect the first layer and second layer, wherein cavities are formed by the first layer, the second layer, and the walls; a fluid at least partially filling the cavities; and blocks integrally connected to the first layer of material, and defining housings filled at least partially with the material of the second layer and not including any of the fluid.

28 Claims, 4 Drawing Sheets

PRODUCTION OF CAVITIES FILLED WITH A FLUID MATERIAL IN AN OPTICAL MICROTECHNOLOGICAL COMPOUND

FIELD OF THE INVENTION

The invention relates to the production of devices containing hermetic cavities of micronic dimensions defined by walls, wherein a functional fluid is introduced. A specific application relates to "optical" devices for which the functional fluid has specific optical qualities.

The invention relates more specifically to the method for sealing such cavities and the resulting devices.

STATE OF THE RELATED ART

For some, particularly optical, applications, it is required to encapsulate a functional fluid in a tight manner in cavities having dimensions of the order of 50 to 500 microns in width and of the order of 5 to 20 microns in depth and which are defined by walls typically 1 to 10 microns wide. These cavities may be obtained by means of various techniques, particularly by means of micro-machining of a substrate or by means of deposition and structuring of a layer by means of etching or photolithography techniques or any other suitable technique.

The functional fluid to be encapsulated is dependent on the application. It may consist of one or more substances introduced in gel or liquid form and selected for the specific properties thereof, for example optical properties, such as the refractive index, the capability to absorb light or to polarize light, the response to electrical or light stimuli, etc.

The problem to be addressed is that of keeping the fluid in these cavities in a tight manner.

An existing solution, as illustrated in FIG. 1, consists of sealing the cavities by laminating a pre-glued flexible film thereupon, for example a PET film. The adherence of the film is provided in this case on the vertex 140 of the walls 14. This solution displays major drawbacks, the risk of trapping air bubbles in the cavities 16 during the lamination and of removing the functional fluid from therein by projecting same on the vertex 140 of the walls 14, thus preventing the adherence of the film adhesive. In addition, the total surface area of the vertex of the walls ensuring the adherence of the flexible film is small. This adherence may not be sufficient if the cavities have excessively large dimensions in the substrate plane, particularly if the substrate needs to be stacked, for example when mounted on a convex surface.

The patent EP 1 672 394 proposes to produce a plastic membrane on cavities defined by walls and containing a fluid, by means of low-pressure deposition of a plastic material, parylene (also referred to as poly-para-xylylene). This material polymerises at ambient temperature to form a uniform layer moulding the deposition surface thereof. As in the previous case, the parylene film only adheres to the substrate on the vertexes of the walls of the cavities, which may pose a plastic film adherence problem.

The aim of the invention is to propose a device comprising a plurality of cavities filled with a functional fluid, said fluid being kept in the cavity in a tight and durable manner.

Another aim of the invention is to propose a method used to seal cavities filled with a fluid in an efficient and industrial.

DESCRIPTION OF THE INVENTION

According to the invention, in addition to the cavities, housings forming adhesion points of a cavity sealing material are produced.

To this end, the invention relates to a device comprising a first layer of material, a second layer of material and walls defining tight cavities between the first and second layers of material at least partially filled with a fluid, blocks rigidly connected to the first layer of material, and defining a housing filled at least partially with the material of the second layer.

Advantageously, the walls and the blocks have substantially the same height.

According to one alternative embodiment, at least part of some blocks forms walls.

According to one alternative embodiment, all the blocks partially form walls.

Preferably, at least part of the blocks are located at the intersection of several walls.

According to one alternative embodiment, at least part of the blocks are adjacent to the walls.

Advantageously, the second layer is in contact with the first layer at the housings.

More advantageously, the cavities are filled with a functional fluid having pre-determined optical qualities.

The fluid may be a photosensitive or heat-sensitive fluid, or a fluid having a determined optical index.

Advantageously, the material of the second layer is parylene.

More advantageously, the material of the second layer is deposited in a conforming manner.

According to a first alternative embodiment, the housings are completely filled with the material of the second layer.

According to a second alternative embodiment, the housings are partially filled with material from the second layer. The housings partially filled with material from the second layer may be filled advantageously with a material. This material preferably has the same optical refractive index as that of the functional fluid, in order to limit optical diffusion problems induced by the presence of the blocks, after the deposition of the sealing material in the block housing sealing the cavities. In order to facilitate this filling, without having to monitor the parameters, this material having the same optical index may be deposited so as to form a uniform layer over the layer of sealing material and in the volume remaining in the housing of each block.

More preferably, the material having the same optical index as that of the fluid and filling the block housing completely forms a third layer of material superimposed on the second layer of material.

The invention also relates to a method for producing a device provided with cavities comprising a functional fluid separated by walls comprising the following steps:
  production on a structure of walls defining the cavities,
  production on the face of the structure in contact with the walls, of blocks defining at least one housing,
  filling of cavities by a functional fluid,
  conforming deposition of a continuous layer of a sealing material sealing the cavities filled with functional fluid and occupying the inside of the housings at least partially.

Advantageously, the conforming deposition of a continuous layer of a sealing material is a parylene deposition, which may be a CVD deposition followed by polymerisation under ambient conditions.

According to one advantageous embodiment, the blocks are produced using the same method and at the same time as the walls.

The production of the walls and/or blocks may be produced advantageously by means of resin photolithography.

According to an alternative embodiment, the production of the walls and/or blocks is performed by means of etching via a mask of a polymer layer.

Advantageously, the filling of the cavities is performed by means of a functional fluid jet technique in drop form using print head(s).

After the deposition of the sealing material in the block housing sealing the cavities, the residual volume in the housing coated with sealing material is filled with a material.

After the deposition of the sealing material in the block housing sealing the cavities, it is possible to deposit a material on the layer of sealing material and in the residual volume in the block housing.

Advantageously, the deposition of the material is performed by means of the spin coating type technique followed by hardening of the material.

The walls and blocks may also entirely permeate through a layer of material, for example transparent to, or absorbing, light, or more generally the radiation of interest, deposited on a substrate.

According to the desired use, the unit size and density of the blocks within the grid formed by the cavities may vary. The shape of the blocks according to the invention may also vary (cylindrical, square cross section, etc.).

Irrespective of these parameters selected for the blocks, it is preferably required that the blocks finished according to the method of the invention do not add any optical interference. In particular, it may be ensured that their total surface area does not exceed 10%, and preferably, 4% of the total apparent surface area covered with cavities and filled with functional fluid.

The sealing material selected will depend on the desired application and according to a technique enabling of a uniform thickness of a few hundred nanometers to a few microns.

BRIEF DESCRIPTION OF FIGURES

Other features and advantages of the invention will emerge more clearly on reading the following description and with reference to the appended figures, which are given for purely illustrative purposes and are in no way limitative.

DETAILED DESCRIPTION OF SPECIFIC EMBODIMENTS

Figure 1:
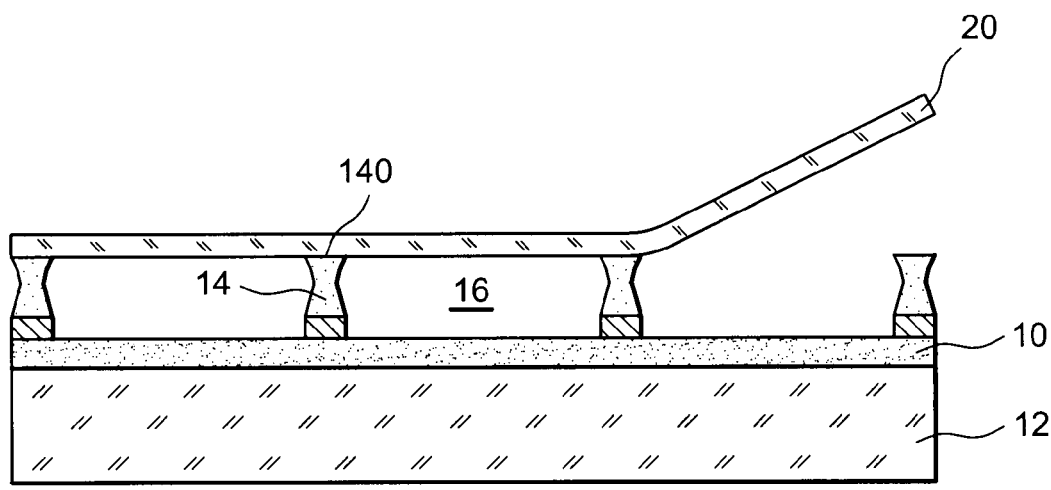
FIG. 1 illustrates the sealing of one of the embodiments of the method according to the application FR 06 50466.
Figure 2A:
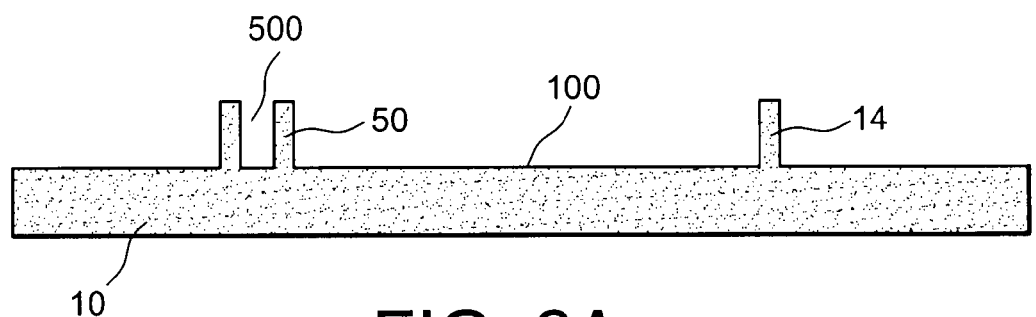
FIGS. 2A to 2C illustrate an embodiment of the method according to the invention.
Figure 2B:
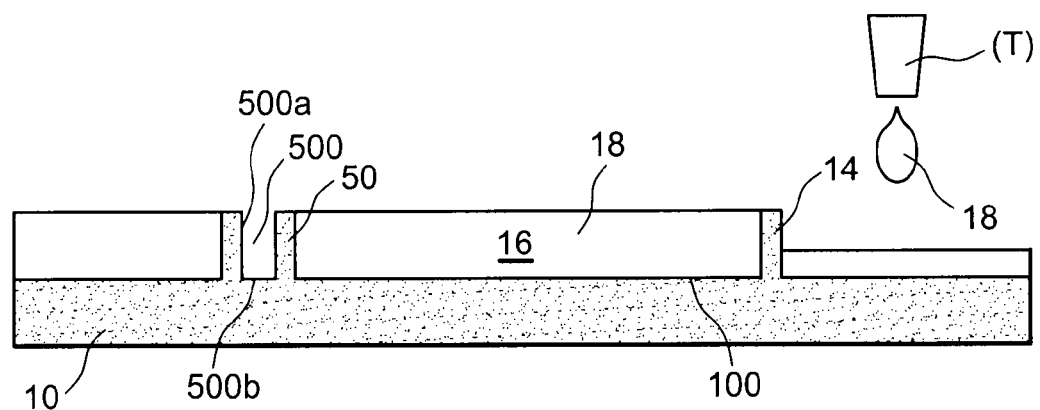
Figure 2C:
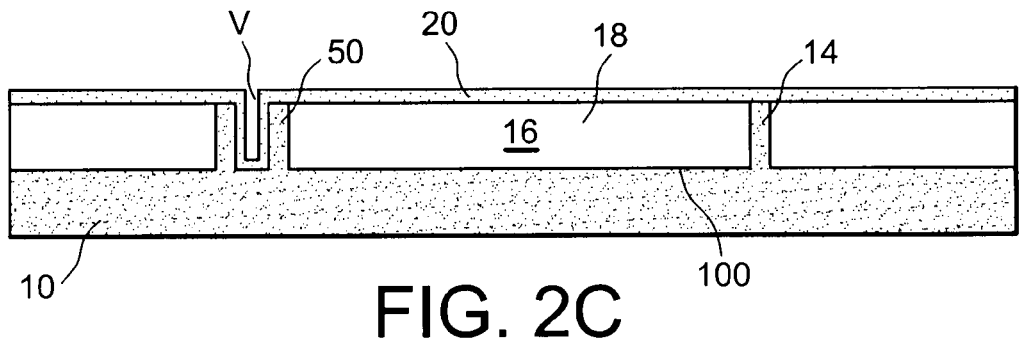
Figure 2D:
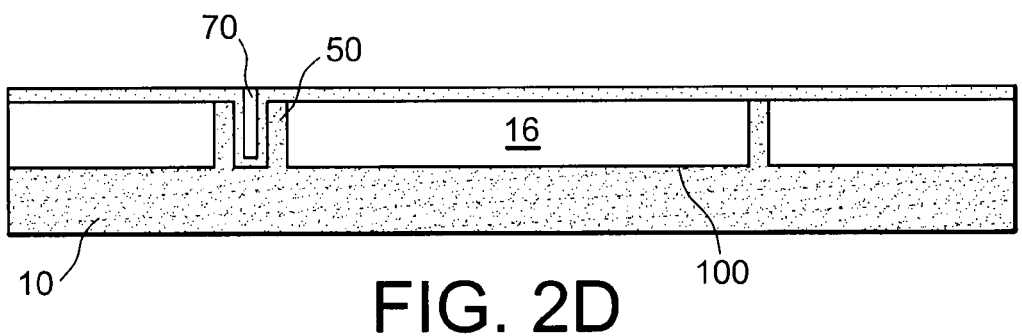
FIGS. 2D and 2D' illustrate additional advantageous steps of the method according to the invention.
Figure 2D:
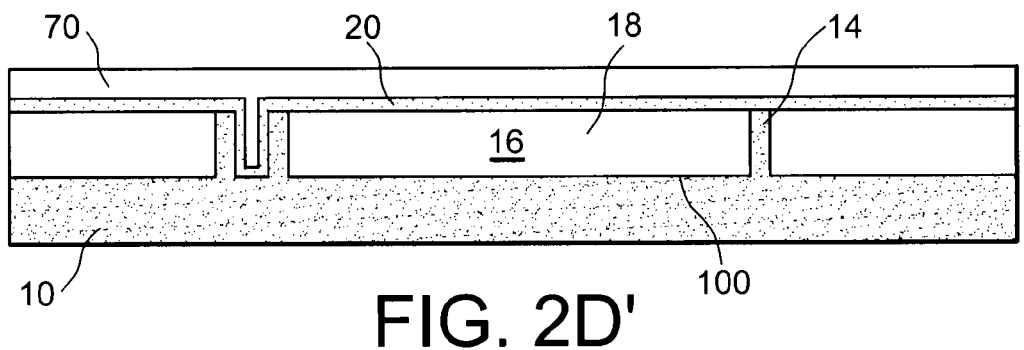

An example of a device according to the invention is illustrated in FIG. 2C. This device comprises a plurality of cavities 16 at least partially filled with a fluid 18. Each cavity 16 is defined by a layer or a substrate 10, a so-called sealing layer 20, and laterally, by walls 14 and/or blocks 50. The blocks 50 define housings 500 at least partially filled with the material of the sealing layer 20. In this way, the contact zone between the sealing layer and a solid material is increased with respect to the devices according to the prior art, making it possible to obtain improved adherence of the sealing layer and increased mechanical resistance of said layer, particularly with respect to extraction and/or shearing stress, etc. The fluid 18 is thus kept in the cavities 16 in a tight and durable manner.

As explained below, the blocks 50, 60 or a part thereof may be an integral part of the walls 14.

The sealing layer 20 is made of a polymerisable material in non-miscible solution with the functional fluid 18, i.e. without interaction with the functional fluid 18. It is polymerisable under ambient, hot or irradiation conditions.

Advantageously, the material 20 used is parylene, which is deposited by means of CVD (abbreviation of "Chemical Vapour Deposition") at ambient temperature in a highly conforming manner, i.e. moulding the shapes whereon it is deposited, such as in this case the walls 14, the functional fluid 18 and the blocks 50 and the housings 500 thereof. This material may be deposited on fluids wherein the vapour tension is lower than the deposition chamber pressure. This polymer enables a high-performance full coating. The linear and crystalline structure resulting from the treatment has good optical qualities (parylene is colourless and transparent) and good protection properties (parylene is impermeable, resistant to corrosive environments, solvents and gases).

Preferably, the thickness e of the layer of sealing material is between 0.2 and 5 µm.

Figure 2E:
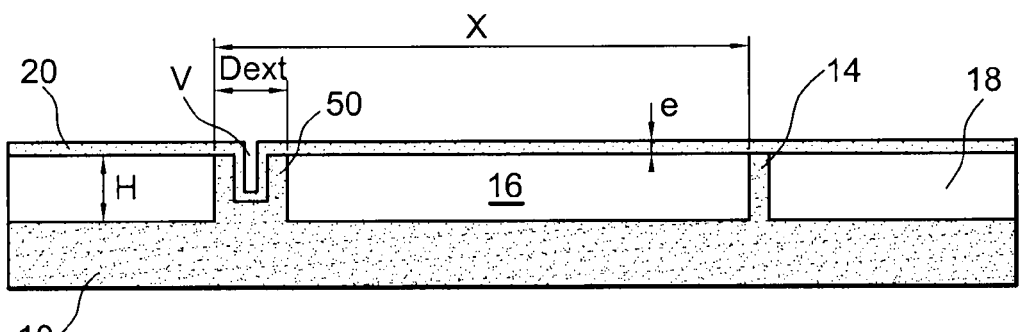
FIGS. 2E and 2F illustrate alternative embodiments of the device according to the invention.

The deposition may be performed such that the sealing material fills the housings 500 of the blocks 50 completely, whether said housings open onto the face 100 of the layer of material 10 (FIG. 2C) or not (FIG. 2E).

In the advantageous embodiment wherein the blocks 50 open (FIG. 2C, 2F), as the deposition is conforming, a contact zone binds the sealing layer 20 with the layer of material or substrate 10, which is even more favourable for the overall mechanical strength.

The size, location and density of the blocks 50 or micro-cavities to be positioned in the cavities 16 would be dependent on the use. Those skilled in the art would particular ensure for optical, especially ophthalmic, uses, that the blocks 50 do not add any redhibitory visual interference.

Advantageously, each block 50 has an outer diameter Dext between 1 and 20 µm (FIG. 2E).

The functional fluid 18 may fill the cavities 16 partially or completely. The filling height H of the functional fluid 18 is advantageously between 5 and 20 µm (FIG. 2E).

Figure 2F:
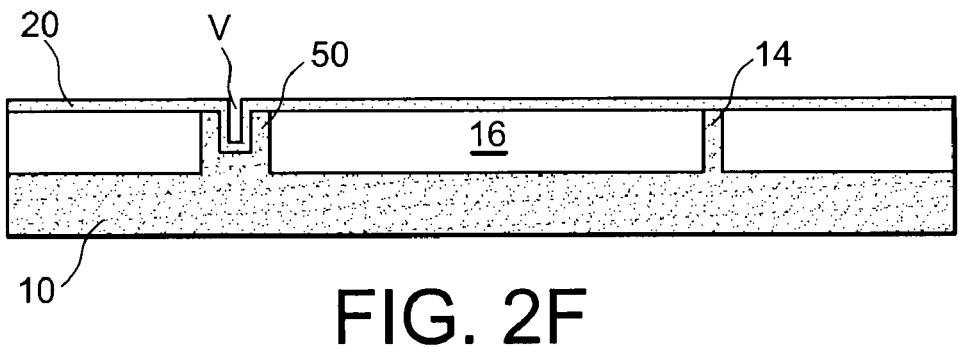

In the advantageous embodiment wherein the blocks 50 are open, the parylene deposited may fill the micro-cavity 50 completely (FIG. 2F).

Figure 3A:
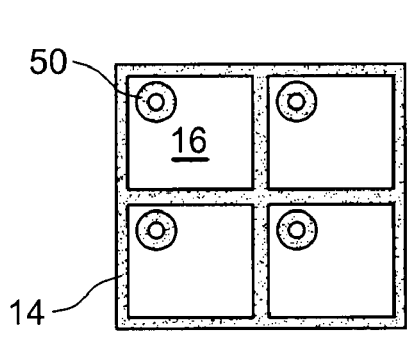
FIGS. 3A to 3D illustrate various alternative layouts of the blocks according to the invention.
Figure 3B:
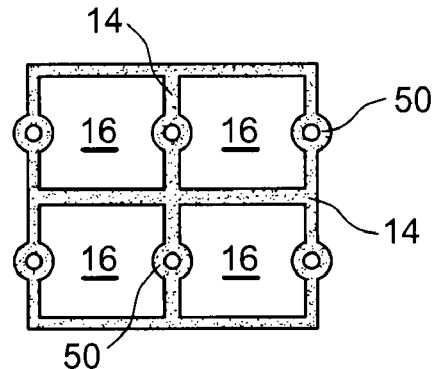
Figure 3C:
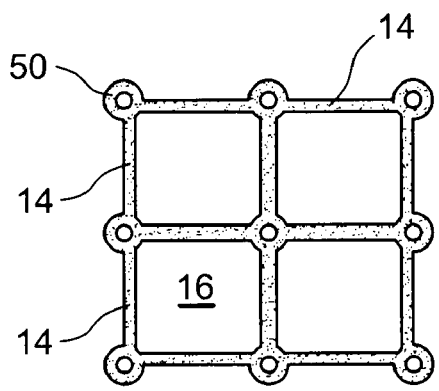

The blocks or micro-cavities 50 may be located in a cavity 16 or within the walls 14. Several configurations (that may be combined) are presented in FIGS. 3A to 3C:

FIG. 3A illustrates the creation of a block 50 within each cavity 16 (naturally, it is possible to create several for each cavity), FIG. 3B illustrates that it is possible for the blocks 50 to be an integral part of the walls 14, FIG. 3C illustrates that the blocks 50 may be located at the intersection of the walls 14.

Within the scope of the invention, the blocks or micro-cavities 50 and the housings 500 may have different shapes (possibly chosen independently): round, square, rectangular, cross-shaped, star-shaped, etc. . . . .

Figure 3D:
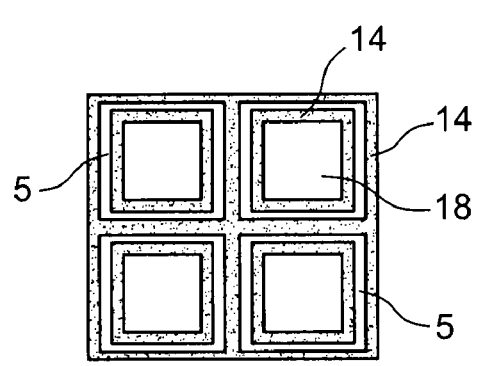

For less optically restrictive uses, it may be favourable to envisage blocks 50 forming channels 5, a continuous channel 5 surrounding each cavity 16 (FIG. 3D).

In very restrictive uses wherein the cavities are filled with an ophthalmic fluid, the filling factor of the cavities 16 (i.e. the apparent filled surface area ratio with respect to the total structure surface area) must be greater than 90%, and preferably between 96% and 98.5%. In this way, for these uses, blocks 50 wherein the apparent surface area with respect to that of the total surface area is less than 10% are sought.

Figure 4:
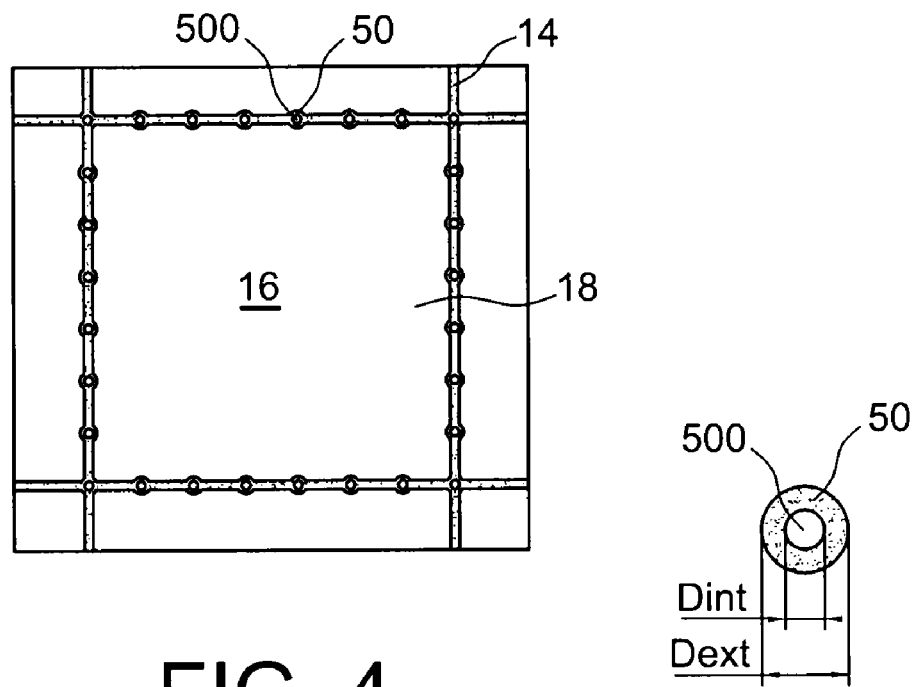
FIGS. 4 and 5 illustrate two advantageous distribution modes of the blocks according to the invention.
Figure 5:
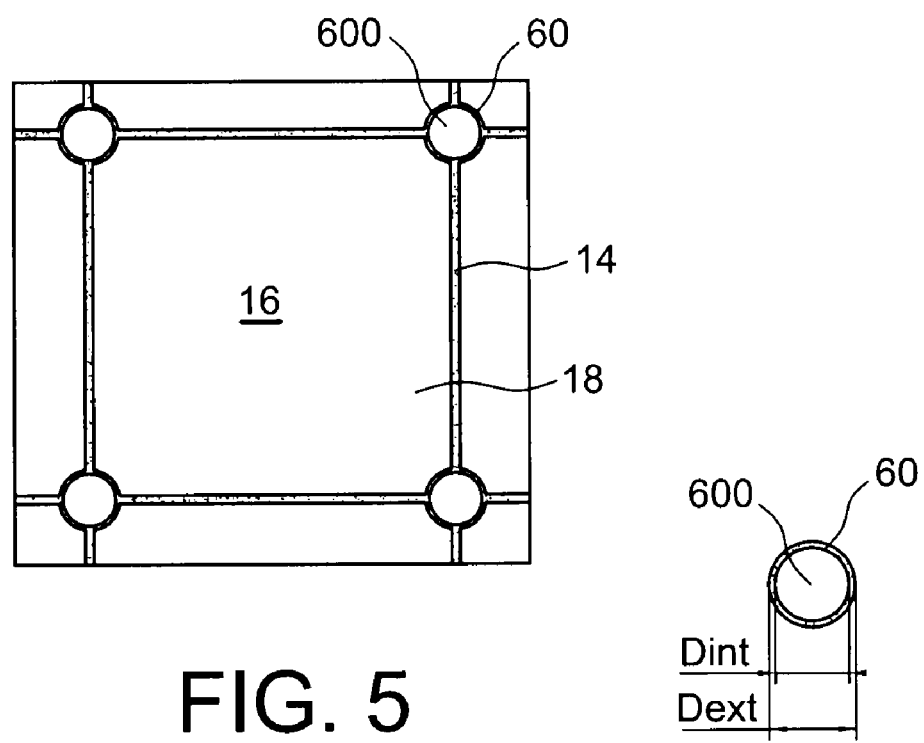

In the embodiments corresponding to FIGS. 4 and 5, whereby the 2 μm thick walls 14 form cavities 16, having a side cross section of 200 μm, the apparent surface area ratio is 2% (the apparent wall surface area being equal to 800 μm² for a total cavity surface area equal to 200×200 μm²). In this way, it is possible to have an apparent surface area of 800 μm² to produce blocks 50, 60 of an apparent surface area preferably equal to 4%.

Using suitable masks for example for obtaining hollow cylindrical blocks 50, 60, it is thus advantageously possible to produce blocks 50, 60 of the same unit width of 2 μm as that of the walls and distribute indifferently:

a number equal to 28 having an internal diameter $D_{int}$ of 4 μm around a cavity according to FIG. 4, a number equal to 4 having an internal diameter $D_{int}$ of 16 μm around a cavity according to FIG. 5.

A method for producing the invention will be described with reference to FIGS. 2A to 2D.

A substrate or material layer 10 is used to produce the cavities 16. For optical applications, this substrate 10 is advantageously transparent. It may be a quartz glass plate or a PET (Poly Ethylene Terephthalate) type flexible film. This substrate 10 may, if required, be temporarily rigidly connected to a support plate (not shown), for example a silicon type wafer or a glass plate so as to ensure sufficient mechanical strength to carry out the subsequent technological steps. The assembly may, for example, be carried out by means of suitable gluing, wherein the gluing energy is both compatible with the subsequent technological steps and with the subsequent disassembly of the support plate.

Depending on the use, the substrate 10 may be functionalised. This is the case for example during the production of liquid crystal-based displays: metal tracks and a crystal alignment layer are provided on the substrate.

This substrate 10 may comprise on the surface one or more layers having specific functions for example shock resistance, scratch resistance, colouring functions, etc.

Walls 14 are produced on the surface of the substrate 10 to define cavities 16 intended to contain the functional fluid. Blocks 50 are also produced, advantageously at the same time as the walls 14, to define housings 500 intended to form the future anchoring blocks of the sealing layer. Some of the blocks 50, may also serve to define some of the cavities 16 intended to contain the functional fluid at the same time.

The walls 14 and the blocks 50 may for example be produced by depositing one (or more) suitable photosensitive resins and removing said resin locally to define the cavities 16 and the housings 500.

As an alternative, it is possible to deposit a layer of polymer on the substrate and etch said layer locally via a mask, for example by means of conventional or high-density RIE plasma etching with $O_2$ mixed or not with a fluorinated gas such as $SF_6$ and/or $CHF_3$.

It is also possible to laminate on the substrate 10 a polymer film wherein the cavities 16 and housings 500 have been previously produced, for example by means of etching.

The walls 14 and the blocks 50 are advantageously produced simultaneously during the same preparation method. However, it is naturally possible to produce the walls 14 and the blocks 500 by means of separate methods (if they are compatible) and/or successively.

In FIG. 2B, housings 500 opening onto the substrate 10 are obtained, but it is possible, particularly when the housing 500 is obtained by means of etching, for there to remain at the bottom of the housing, in contact with the substrate 10, a separate material from the substrate, for example the polymer wherein the blocks 50 were produced.

Then, each cavity 16 is filled selectively with functional fluid 18, for example as illustrated in FIG. 3B, until the vertex 140 of the walls 14 is reached and taking care not to fill the housings 500. This is advantageously performed by equipment spraying jets in drop form, for example print heads (T) spraying drops of a volume of the order of 5 pico-litres, the jet exclusively aiming the inside of the cavities 16.

Then, according to the invention, (FIG. 2C), the deposition of a conforming layer of sealing material 20, preferably parylene, is performed on the surface opposite the substrate 10, particularly consisting of the vertex 140 of the walls, the fluid 18 and the surface of the housings 500. This deposition is preferably performed in gas phase (CVD deposition for chemical vapour deposition) at ambient temperature on a uniform thickness, depending on the uses from a few nanometers to a few μm. The conforming deposition enables the deposition of the sealing layer not only on the bottom 500b of the housing, consisting (in FIG. 2) of the plane surface 100 of the substrate 10, but also along the inner wall 500a thereof.

The adherence of the sealing material 20 is thus produced both on the vertex 140 of the walls, and inside the housings 500 of the blocks 50, i.e. along the inner wall 500a thereof, and at the bottom 500b. As the adherence of the sealing material 20 is produced on a greater surface area (substantially equal to the entire surface wall vertex surface area whereto those 500a and 500b of the blocks 50 are added), it is much more effective than merely laminating the film at the vertex of the walls 14.

According to one alternative embodiment of the invention, another material 70, such as a polymer, may be deposited, in the housings 500, on the surface of the layer of sealing material 20, preferably until the residual volume V inside the housings 500 is filled. This alternative embodiment may be particularly advantageous for optical applications, the presence of a residual volume V inside the housings 500 may cause unacceptable optical interference (diffusion, diffraction, etc.). In this case, a material 70 having the same optical index as that of the functional fluid 18 would be selected.

This deposition of material 70 may be performed by taking care to fill only the residual volume V (FIG. 3D), for example, localised deposition, for example using a material jet printer. It may alternatively, particularly if the volumes to be filled are very small, be performed until a third uniform layer of material 70 is obtained above the sealing layer 20 (FIG. 2D'), for example by means of spin coating deposition and setting of the deposited material.

For example, it may consist of a photosensitive polymer applied with a spinner and thermally hardened. In this example, in order to facilitate the filling of the residual volume V of the housings 500 and particularly expel the air bubbles that may be trapped in the blocks, it is possible to create a vacuum after the application and before the setting of the polymer.

One or more additional layers may then be deposited depending on the use. For example, in the case of an optical use, it would be possible to envisage layers having shock resistance, scratch resistance, colouring, glare-proof, dirt-proof functions, etc.

Naturally, these embodiments are only given as an indication, and the various selections made may be combined together to also be included in a method or a device according to the invention.

The invention thus has numerous uses in the field of optics, particularly for the production of photochromic films, passive polarising films, liquid crystal display viewing screens, etc. It may be applied more generally to any fields wherein it is required to encapsulate a fluid in tight cavities having micronic dimensions, for example to produce fluid channels, micro-sensors, actuators, etc.

The invention claimed is:

1. A device comprising:
   a first layer of material;
   a second layer of material disposed as a sealing layer;
   walls disposed to interconnect the first layer and second layer,
   wherein cavities are formed by the first layer, the second layer, and said walls;
   a fluid at least partially filling the cavities; and
   blocks connected to the first layer of material, and defining housings that are at least partially filled with the material of the second layer and not including any of the fluid.

2. The device according to claim 1, wherein the walls and the blocks have substantially a same height.

3. The device according to claim 1, wherein at least part of some of the blocks form the walls.

4. The device according to claim 1, wherein all the blocks partially form the walls.

5. The device according to claim 1, wherein at least part of the blocks are located at an intersection of several of the walls.

6. The device according to claim 1, wherein at least part of the blocks are adjacent to the walls.

7. The device according to claim 1, wherein the second layer is in contact with the first layer at the housings.

8. The device according to claim 1, wherein the fluid has optical qualities.

9. The device according to claim 8, wherein the fluid is a photosensitive or heat-sensitive fluid, or a fluid having a predetermined optical index.

10. The device according to claim 1, wherein the material of the second layer is parylene.

11. The device according to claim 1, wherein the material of the second layer is included in a conforming manner in the housings and on the cavities.

12. The device according to claim 1, wherein the housings are completely filled with the material of the second layer.

13. The device according to claim 1, wherein the housings are partially filled with material from the second layer.

14. The device according to claim 13 wherein the housings partially filled with the material from the second layer are also filled with another material.

15. The device according to claim 14, wherein said another material has a same optical index as that of the fluid.

16. The device according to claim 15, wherein the another material having the same optical index as that of the fluid and filling the housings of the blocks forms a third layer of material superimposed on the second layer of material.

17. The device according to claim 1, wherein the blocks are rigidly connected to the first layer.

18. A method for producing a device provided with cavities filled with a fluid separated by walls, the method comprising:
    providing, on a first layer of material, walls disposed to define the cavities;
    providing blocks connected to the first layer, the blocks defining at least one housing;
    filling the cavities with the fluid and not including the fluid in the at least one housing; and
    providing a continuous layer of a sealing material that seals the cavities filled with the fluid and at least partially filing an opening inside of the at least one housing.

19. The method according to claim 18, wherein the providing the continuous layer of the sealing material includes providing a parylene deposition.

20. The method according to claim 19, wherein the providing the parylene deposition includes providing a CVD deposition followed by polymerisation under ambient conditions.

21. The method according to claim 18, further comprising:
    producing the blocks and the walls at a same time using a same method.

22. The method according to claim 18, wherein the providing the walls or the providing the blocks includes using resin photolithography.

23. The method according to claim 18, wherein the providing the walls or the providing the blocks includes etching via a mask of a polymer layer.

24. The method according to claim 18, wherein the filling of the cavities includes using a print head to provide the fluid by drops.

25. The method according to claim 18, wherein, after the providing of the sealing material at least partially filing the at least one housing, coating a residual volume in the at least one housing with another material.

26. The method according to claim 18, wherein after the providing of the sealing material at least partially filling the at least one housing, depositing another material on the layer of the sealing material and in a residual volume in the at least one housing.

27. The method according to claim 26, wherein the deposition of the another material includes spin coating followed by setting of the another material.

28. The method according to claim 18, wherein the providing blocks connected to the first layer includes providing blocks rigidly connected to the first layer.

* * * * *